(12) United States Patent
Tamai et al.

(10) Patent No.: US 9,941,767 B2
(45) Date of Patent: Apr. 10, 2018

(54) LINEAR ACTUATOR AND ROCKING CONTROLLER FOR RAILWAY VEHICLE

(71) Applicants: MOOG JAPAN LTD., Kanagawa (JP); NIPPON STEEL & SUMITOMO METAL CORPORATION, Tokyo (JP)

(72) Inventors: Masafumi Tamai, Hiratsuka (JP); Osamu Goto, Tokyo (JP)

(73) Assignees: MOOG JAPAN LTD., Kanagawa (JP); NIPPON STEEL & SUMITOMO METAL CORPORATION, Tokyo (JP)

( * ) Notice: Subject to any disclaimer, the term of this patent is extended or adjusted under 35 U.S.C. 154(b) by 313 days.

(21) Appl. No.: 14/904,481

(22) PCT Filed: Jul. 11, 2014

(86) PCT No.: PCT/JP2014/003703
§ 371 (c)(1),
(2) Date: Jan. 12, 2016

(87) PCT Pub. No.: WO2015/008471
PCT Pub. Date: Jan. 22, 2015

(65) Prior Publication Data
US 2016/0149466 A1    May 26, 2016

(30) Foreign Application Priority Data

Jul. 16, 2013  (JP) ................. 2013-147737

(51) Int. Cl.
*H02K 7/00* (2006.01)
*H02K 7/06* (2006.01)
(Continued)

(52) U.S. Cl.
CPC ............... *H02K 7/00* (2013.01); *B61F 5/245* (2013.01); *H02K 5/10* (2013.01); *H02K 5/12* (2013.01);
(Continued)

(58) Field of Classification Search
CPC ......... B61F 5/245; B61F 5/24; H02K 11/225; H02K 5/16; H02K 7/00; H02K 7/06; H02K 5/10; H02K 5/12; H02K 5/1732
(Continued)

(56) References Cited

U.S. PATENT DOCUMENTS 7,389,709 B2    6/2008  Zhou
2006/0005645 A1*  1/2006  Zhou ................... F16H 25/2204
                                                          74/89.34

(Continued)

FOREIGN PATENT DOCUMENTS

CN    103098348 A    5/2013
JP    S64-11858 U    1/1989
(Continued)

OTHER PUBLICATIONS

An Office Action issued by the Chinese Patent Office dated May 10, 2017, which corresponds to Chinese Patent Application No. 201480040522.2 and is related to U.S. Appl. No. 14/904,481; with English language translation.

(Continued)

*Primary Examiner* — Naishadh Desai
(74) *Attorney, Agent, or Firm* — Studebaker & Brackett PC (57) ABSTRACT

To provide a compact linear actuator having small back drive force. The linear actuator includes: a hollow rotor that has a magnet fixed to a part of the outer peripheral surface thereof and having an open end and a closed end; a main body that has a hollow structure having an open end and a closed end and rotatably accommodates the rotor in the hollow structure, and is fixed with a stator winding facing the magnet; a linear motion converting section that is arranged in the hollow section of the rotor and is linearly moved in the axial direction by the rotation of the rotor; a (Continued)

linear motion rod that has one end fixed to the linear motion converting section, and the other end extended from the open end of the main body, and has, on the outer periphery thereof, a slide section made to slide in the axial direction with respect to a linear motion seal of the opening of the main body; and a resolver that is configured by a rotator fixed at the radial outer side of the outer peripheral surface of the rotor and on the open end side of the closed end section of the rotor, and a stator fixed to the main body at a part of the angular range on the radial outer side of the rotator, the linear actuator being configured such that the rotor is supported by the main body at the open side and the closed end of the magnet and the stator winding so as to be rotatable about the axis of the rotor, and such that the whole of the hollow rotor is accommodated in the sealed space.

12 Claims, 4 Drawing Sheets

(51) Int. Cl.
*H02K 11/225* (2016.01)
*B61F 5/24* (2006.01)
*H02K 5/16* (2006.01)
*H02K 5/10* (2006.01)
*H02K 5/12* (2006.01)
*H02K 5/173* (2006.01)

(52) U.S. Cl.
CPC .............. *H02K 5/16* (2013.01); *H02K 5/1732* (2013.01); *H02K 7/06* (2013.01); *H02K 11/225* (2016.01)

(58) Field of Classification Search
USPC ..................................................... 310/12–15
See application file for complete search history.

(56) References Cited

U.S. PATENT DOCUMENTS

| 2013/0112104 | A1 | 5/2013 | Tamai et al. |
| 2015/0015104 | A1* | 1/2015 | Kataoka ................... H02K 7/06 310/80 |

FOREIGN PATENT DOCUMENTS

| JP | 2002-112507 A | 4/2002 |
| JP | 2002-130419 A | 5/2002 |
| JP | 2003-299314 A | 10/2003 |
| JP | 2005-065362 A | 3/2005 |
| JP | 2008-505289 A | 2/2008 |
| JP | 2012-019661 A | 1/2012 |

OTHER PUBLICATIONS

International Search Report and Written Opinion of PCT/JP2014/003703 dated Oct. 7, 2014.
Osamu Goto, "Development of an Active Suspension System with EMA for Railway Vehicles," (2013) pp. 48-55.
An Office Action, "Notification of Reason for Refusal", issued by the Korean Patent Office dated Feb. 20, 2017, which corresponds to Korean Patent Application No. 10-2016-7001686 and is related to U.S. Appl. No. 14/904,481.
Translation of the International Preliminary Report on Patentability of PCT/JP2014/003703 dated Jan. 28, 2016.
An Office Action; "Notification of Reason for Rejection," issued by the Japanese Patent Office on Sep. 27, 2016, which corresponds to Japanese Patent Application No. 2015-527174 and is related to U.S. Appl. No. 14/904,481; with English language partial translation.

* cited by examiner

LINEAR ACTUATOR AND ROCKING CONTROLLER FOR RAILWAY VEHICLE

TECHNICAL FIELD

The present invention relates to a linear actuator, and particularly relates to a linear actuator that is mounted to a vehicle such as a railway vehicle and uses a hollow motor, which damps vibration and rocking of the vehicle by an electromagnetic force, and a rocking controller for a railway vehicle, which has the linear actuator.

BACKGROUND ART

In order to suppress vibration and rocking which occur during traveling of a vehicle such as a railway vehicle, a linear actuator is used. Suppressing vibration and rocking in a lateral direction with respect to a traveling direction of a vehicle plays an important role to give passengers a comfortable ride and keep safe traveling conditions. In recent years, the study for suppressing rocking and vibration due to the influence of aerodynamic characteristics at the time of high-speed traveling by active control to keep the vehicle attitude stable has been especially advanced. Further, in general, a linear actuator that is used for prevention of rocking of a railway vehicle is used under a condition in which maintenance, such as frequent exchange, cannot be easily performed. Nevertheless, it is required to maintain the function of the linear actuator stably even when the linear actuator is used under a severe temperature condition in which the temperature variation of the installation and operation environment is large (for example, −20° C. to 60° C.). Further, a linear actuator for suppressing vibration and rocking generated during travelling of a railway vehicle needs to be installed in a limited space between the bogie truck and the vehicle body of the railway vehicle, and hence it is necessary that the size of the linear actuator is reduced to maintain the required stroke.

Patent Literature 1 discloses a linear actuator. The linear actuator includes: a main body of a hollow structure having an open end portion and a closed end portion; a cylinder which is fixed to the closed end portion side in the main body and has an open end at the open end portion side; a linear motion rod which has one end extended from the open end portion of the main body, and a wear ring provided at the outer peripheral section of the other end thereof, and which is accommodated in the cylinder so as to be slidable in the axial direction; and a hollow shaft which is rotatably supported in the main body. The linear actuator is disclosed such that the hollow shaft has a permanent magnet at a part of the outer peripheral surface thereof, such that a winding section provided at a portion of the inner surface of the main body, and the permanent magnet configure a hollow motor, such that a nut section coaxially fixed to the hollow shaft, and a screw section of the outer peripheral surface of the linear motion rod are engaged with each other to form a rotation/linear motion converting mechanism, and such that a rotation oil seal section is provided so as to seal between the hollow shaft and the main body on both axial direction sides of the nut section. Therefore, a compact linear actuator is disclosed in which back drive force is small and, in which sticking due to abrasion powders, or the like, hardly occurs.

Patent Literature 2 discloses an electro-mechanical linear actuator configured such that a nut is rotatably accommodated in a frame, and a hollow motor is configured by a magnet fixed to the outer periphery of the nut, and a coil fixed to the inner periphery of the frame, such that a screw is formed in the nut, and a reverse transfer system-ball screw is configured by the screw, the nut, and a plurality of balls which are disposed between the screw and the nut so as to circulate along a cooperative ball groove forming the path of the balls, and such that a rod fixed to the screw is driven in the axial direction by the rotation of the hollow motor.

CITATION LIST

Patent Literature

PTL 1: Japanese Patent Application Laid-Open No. 2012-019661

PTL 2: Japanese Patent Application Laid-Open No. 2008-505289

SUMMARY OF INVENTION

Technical Problem

In the linear actuator of the cited literature 1, the rotation/linear motion converting section is fixed to the main body, in which the rod is internally engaged with the rotation/linear motion converting section so as to linearly move forward and backward with respect to the rotation/linear motion converting section (main body). Screw threads corresponding to the stroke length are provided on the outer surface of the rod section engaged with the rotation/linear motion converting section. Therefore, in order to keep air tightness in the actuator, it is required that the actuator is configured such that the air tightness is maintained at portions which are respectively located at the front and rear sides of the rotation/linear motion mechanism, and which are mutually separated by a distance longer than the stroke length. Therefore, there is a limitation in reducing the overall length of the apparatus.

Further, in the linear actuator according to the cited literature 2, since the reverse transfer system ball-screw, as a rotation/linear motion converting mechanism, is fixed to the rod which is linearly moved, the screw threads corresponding to the stroke length are formed in the inner peripheral surface of the nut section, and no screw thread is formed on the outer periphery of the rod section. Therefore, a seal section of the rod section can be formed at the end portion of the nut section, and hence the overall length can be reduced. However, at the end section opposite to the expansion and contraction side of the rod, a mechanism for detecting the rotation angle of the nut section is formed, and thereby the reduction of the length of the apparatus is restricted.

The present invention provides a linear actuator which does not require an external apparatus, such as a pressure generator, in addition to the main body of the linear actuator and also does not require the installation of pipes for pressurized fluid serving as a drive source required in a controller using pressurized fluid, and which hence can be downsized by reducing the total length and outer diameter thereof. An object of the present invention is to provide a linear actuator which has a function as an actuator applying desired driving force or damping force, and which, when the function as the actuator is not necessary, can be easily driven without applying a large load (back drive force) to external force, and is also made to stably function with low back drive force, even under a severe use condition where it is difficult to perform maintenance, such as frequent replacement, and where the temperature change in the installation and use environment is large (−20° C. to 60° C.)

Solution to Problem

The linear actuator of the present invention has following features.

The linear actuator includes: a hollow rotor that has a magnet fixed to a part of the outer peripheral surface thereof, and a spiral groove formed in the inner peripheral surface thereof, and has a hollow structure having an open end portion and a closed end portion;

a main body having a hollow structure which has an opening end portion and a closed end portion, and in which the hollow rotor is supported and accommodate so as to be rotatably about the axis of rotation of the hollow rotor, and having a stator winding at a position facing the magnet of the hollow rotor;

a rotation/linear motion converting section that is arranged in the hollow structure of the hollow rotor and is engaged with the spiral groove to be linearly moved in the axial direction of the hollow rotor by the rotation of this hollow rotor;

a linear motion rod that has one end portion fixed to the rotation/linear motion converting section, and the other end portion extended from the open end portion of the main body, and has, on the outer periphery thereof, a slide section made to slide in the axial direction via a linear motion oil seal arranged at the open end portion of the main body, so that the linear motion oil seal and the slide section cooperate with each other to form a sealed space in the inside of the main body; and a segment type resolver that is configured by a resolver rotor fixed to the radial outer side of the outer peripheral surface of the hollow rotor and to the open end portion side of the end surface of the closed end portion of the hollow rotor, and a resolver stator fixed to the main body at a part of the angular range about the axis of rotation of the hollow rotor and on the radial outer side of the resolver rotor, the linear actuator being configured such that: the magnet and the stator winding configure a hollow motor;

the main body include first rotary support means which, on the open end portion side of the portion formed with the hollow motor, supports the hollow rotor so as to allow the hollow rotor to rotate about the axis of rotation of the hollow rotor with respect to the main body, and second rotary support means which, at the closed end portion of the main body, supports the closed end portion of the hollow rotor so as to allow the hollow rotor to rotate about the axis of rotation of the hollow rotor; and the whole of the hollow rotor is accommodated in the sealed space.

A rocking controller for a railway vehicle according to the present invention includes the linear actuator installed between the bogie truck and the vehicle body of the railway vehicle, and a controller actively controlling the drive of the linear actuator so as to suppress rocking of the vehicle body.

Advantageous Effects of Invention

The linear actuator of the present invention, which is configured such that no external apparatus is required in addition to the main body, and such that it is not necessary to install pressurized fluid pipes of a drive source required in the case of a controller using pressurized fluid, and thereby the total length and outer diameter can be reduced, provides a function as an actuator applying desired driving force or damping force. Further, the linear actuator is configured, when the function as the actuator is not required, to be able to be easily driven without applying a large load (back drive force) to external force. Further, the linear actuator realizes stable functions regardless of use environments, such as temperature.

DESCRIPTION OF EMBODIMENTS

In the following, a linear actuator according to the present invention will be described with reference to the accompanying drawings.

Embodiment 1

Figure 1:
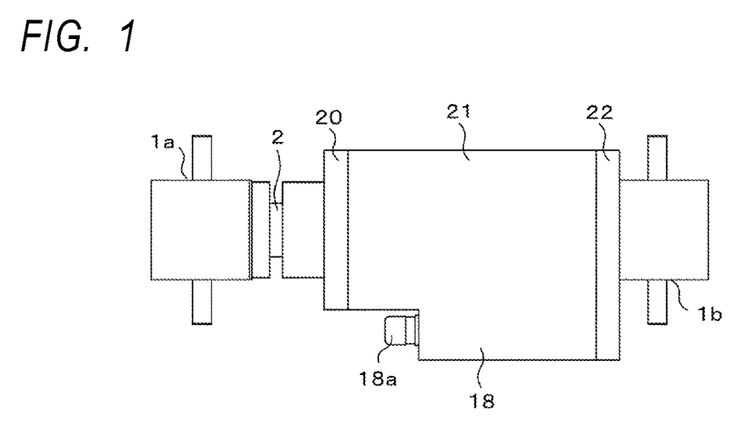
FIG. 1 is a plan view of a linear actuator of the present invention when the linear actuator has a minimum stroke.
Figure 2:
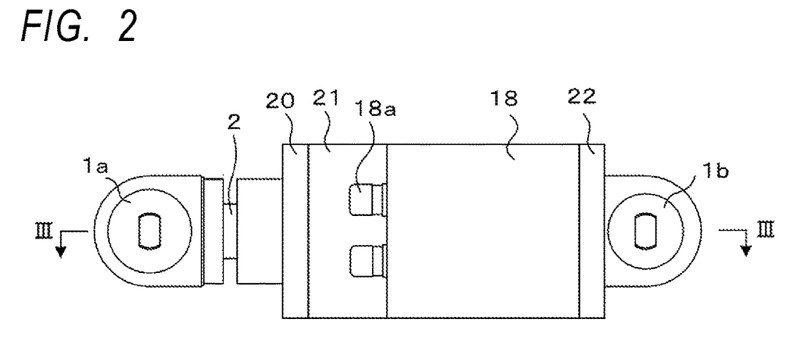
FIG. 2 is a side view of the linear actuator of the present invention when the linear actuator has the minimum stroke.

FIG. 1 is a plan view of a linear actuator of the present embodiment when the linear actuator has a minimum stroke. FIG. 2 is a side view of the linear actuator of the present embodiment when the linear actuator has the minimum stroke. In the linear actuator of the present embodiment, spherical bearings 1a and 1b for connecting a vehicle body and a bogie truck of a railway vehicle are provided at both driving direction ends. A linear motion rod 2 is extended/housed with respect to a hollow rotor (nut section) 10 which will be described below, and which is accommodated in casings 20, 21 and 22, and thereby the interval between the spherical bearings 1a and 1b is changed. A part of the casings (20, 21, 22), which accommodates therein main parts of the actuator of the present embodiment, includes a terminal box 18 having a shape protruding to the side (in the direction perpendicular to the axial direction of the hollow rotor). A power cable and a control wire are taken into the linear actuator from a cable holder 18a.

Figure 3:
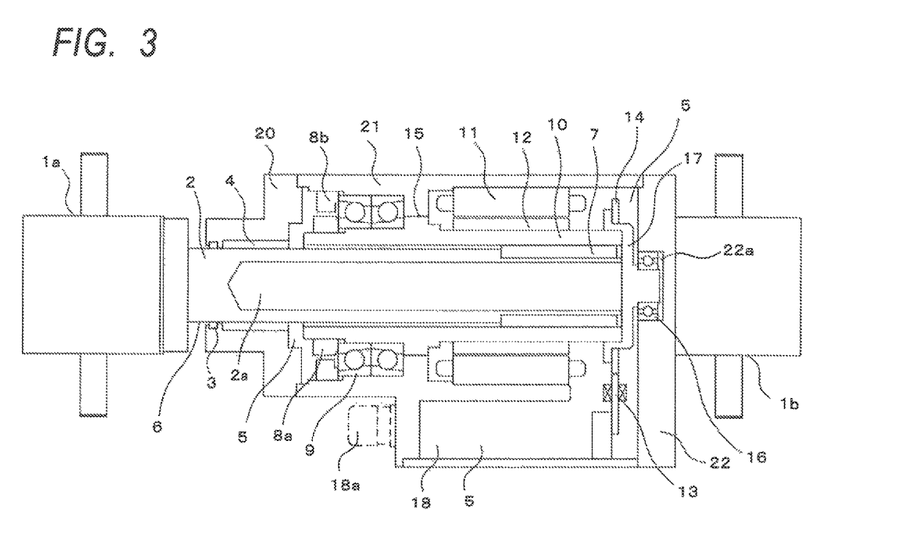
FIG. 3 is a sectional view taken along line III-III in FIG. 2 when the linear actuator of the present invention has the minimum stroke.
Figure 4:
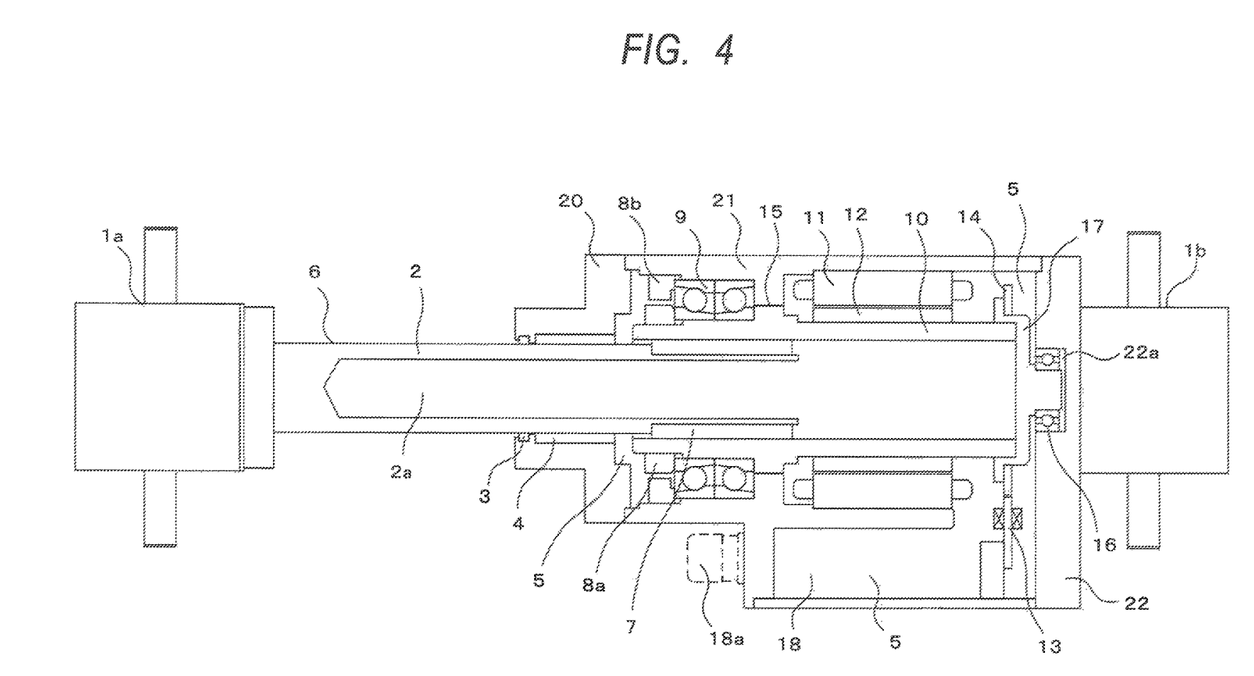
FIG. 4 is a sectional view of the linear actuator of the present invention when the linear actuator has a maximum stroke.

FIG. 3 is a sectional view taken along line III-III in FIG. 2 when the linear actuator of the present embodiment has the minimum stroke. FIG. 4 is a sectional view of the linear actuator of the present embodiment when the linear actuator has a maximum stroke.

The linear actuator of the present invention includes the casings (main bodies) 20, 21 and 22 which accommodate therein main parts in an airtight state, and the hollow rotor (nut section) 10 which is rotatably accommodated in the casings 20, 21 and 22. Further, the linear actuator of the present invention includes: a rotation/linear motion converting section 7 which is arranged in the hollow section of the hollow rotor 10, and which is engaged with a spiral groove formed in the inner peripheral surface of the hollow rotor 10, so as to be linearly moved in the axial direction in the hollow rotor by the rotation of the hollow rotor 10; and the linear motion rod 2 which is connected to the rotation/linear motion converting section 7, and which is extended/housed, in an airtight manner, with respect to the casings according to the linear motion of the rotation/linear motion converting section 7. Further, the linear actuator of the present invention includes the first spherical bearing 1a and the second spherical bearing 1b which are respectively provided at an extension side end portion of the linear motion rod 2 and at the casing rear section 22. When the linear actuator is used as an actuator for preventing rocking of a railway vehicle, the linear actuator is connected to the vehicle body and the bogie truck of the railway vehicle via the spherical bearings 1a and 1b.

In the following, for the sake of simplicity of explanation, the side at which the linear motion rod 2 is extended from the hollow rotor, that is, the side of the first spherical bearing 1a in FIG. 3 is described as the front side, and the side of the second spherical bearing 1b in FIG. 3 is described as the rear side.

The hollow rotor 10 has an open end portion on the front side thereof and a closed end portion on the rear side thereof, and is accommodated and fixed in the casing by an angular bearing 9 (first rotary support means) so as to be rotatably about the rotary shaft of the hollow rotor with respect to the casing. The angular bearing 9 is fixed to the hollow rotor 10 by a bearing fixing nut 8a, and is fixed to the casing central section 21 by a bearing fixing nut 8b. Force applied in the axial direction of the linear actuator (force received by the first and second spherical bearings 1a and 1b) is received by the first spherical bearing 1a, the linear motion rod 2, the rotation/linear motion converting section 7, the hollow rotor 10, the angular bearing 9, the casing central section 21, the casing rear section 22, and the second spherical bearing 1b.

A magnet 12 is installed at a part of the outer peripheral surface of the hollow rotor 10 and on the rear side of the position at which the angular bearing 9 is fixed. A stator winding 11, which is spaced by a predetermined gap from the rotor magnet 12, is installed at a position facing the magnet 12 on the inner peripheral surface of the casing central section 21. A hollow motor is configured by the stator winding 11 and the magnet 12.

The rotation/linear motion converting section 7 is engaged with a groove section formed in the inner peripheral surface of the hollow rotor 10, and thereby a mechanism, in which the rotation/linear motion converting section 7 is linearly moved by rotation of the hollow rotor 10 in the axial direction in the hollow rotor 10, is configured. A known mechanism, which converts rotation to linear motion, can be applied as the rotation/linear motion converting section 7. For example, the rotation/linear motion converting section 7 may be configured by a planetary roller screw, or may be a ball screw structure in which balls are circulated between a groove section formed in the inner peripheral surface of the hollow rotor 10, and a groove section formed in the outer peripheral surface of the rotation/linear motion converting section 7.

The front side of the linear motion rod 2 is extended to the outside of the casing from the open end portion of the casing front section 20. The front end portion, which is one end of the linear motion rod 2, is connected to the spherical bearing 1a, and the rear end portion, which is the other end of the linear motion rod 2, is fixed to the rotation/linear motion converting section 7. The linear motion rod 2 includes a slide section 6 which cooperates with a linear motion oil seal 3 of the casing front section 20 and thereby slides in the axial direction in an airtight manner. The inside of the hollow structure formed by the casings 20, 21 and 22 is sealed by the linear motion oil seal 3 installed at the opening of the casing front section 20, and the slide section 6 of the linear motion rod 2. The linear motion rod 2 is supported by a linear motion bearing 4 of the casing front section 20 so as to be linearly movable in the axial direction.

A rotor end cap 17 is fixed at the rear end side of the hollow rotor 10, and thereby the rear end side is sealed to configure a closed end portion. The rear side of the rotor end cap is supported by a bearing 16 (second rotary support means) fixed to a bearing receiving recess 22a which is formed (recessed) in the inner surface (inner wall) of the casing rear section 22 configuring the closed end portion of the casing. Thereby, the rear end portion, which is the closed end portion of the hollow rotor 10, is supported rotatably about the axis of rotation of the hollow rotor 10 with respect to the closed end portion of the casing 22. With this configuration, by the linear motion oil seal 3 installed at the opening of the casing front section 20, and the slide section 6 of the linear motion rod 2, the hollow rotor 10 as a whole is configured to be accommodated in a hollow structure (sealed space) formed by the casings 20, 21 and 22. The linear motion oil seal 3 is only the sliding seal mechanism with respect to the operation (linear motion of the linear motion rod 2 and rotation of the hollow rotor 10) of the linear actuator. The hollow rotor 10 is mechanically connected, only by the bearing mechanism, to the non-rotating portions, such as the casings 20, 21, 22, and the linear motion rod 2. That is, the hollow rotor 10 is not provided with the sliding seal mechanism between itself and the non-rotating portions (the casing, the linear motion rod) which are not rotated with rotation of the hollow rotor 10. With this configuration, when the power of the linear actuator is turned off, the linear actuator can be driven in the state where a load (back drive force) applied to external force is reduced as much as possible.

Figure 5:
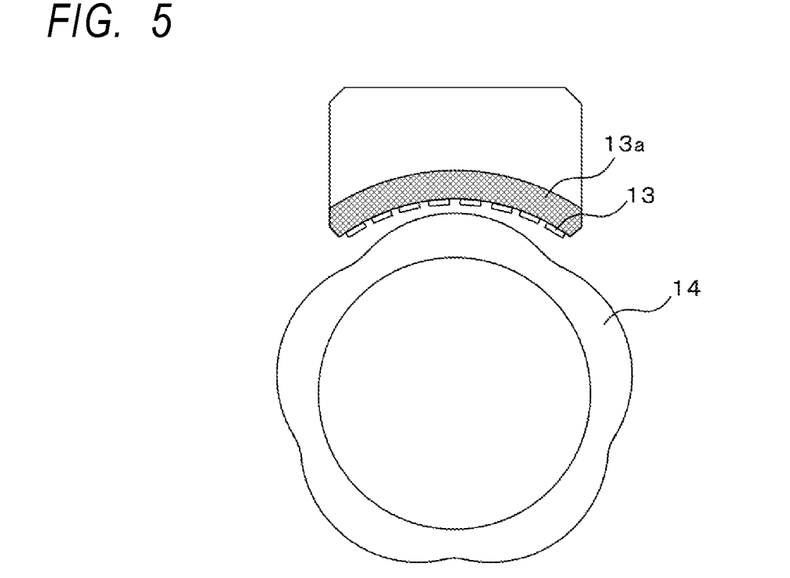
FIG. 5 is a schematic view of a segment resolver of the linear actuator of the present invention.

In the linear actuator of the present embodiment, the angle of rotation of the hollow rotor 10 is detected by a segment type resolver 13 and 14. FIG. 5 shows an example of the segment type resolver 13 and 14. The resolver rotor section 14 of a segment type VR resolver (segment-type variable reluctance type resolver) is fixed over the entire circumference on the open end portion side of the end surface of the closed end portion of the hollow rotor 10, and on the radially outer side of the outer peripheral surface of the hollow rotor 10. In the present embodiment, the resolver rotor section 14 is fixed and installed on the rotor end cap 17 fixed to the rear end portion side of the hollow rotor 10. Further, as shown in FIG. 5, the resolver stator section 13 of the segment resolver is arranged only at a part of the rotation angle range about the axis of the hollow rotor 10. Specifically, as shown in FIG. 3 and FIG. 4, a winding section 13a is provided at the position corresponding to each of the sensors 13 and arranged in the terminal box in which the power supply and the signal wire are disposed. Thereby, the angle of rotation of the hollow rotor is detected and outputted to a controller (not shown) so as to be used for motor drive control.

The rotation angle detection means in the linear actuator of the present invention is not arranged in a manner of being extended to the axial direction rear portion side of the hollow rotor, and hence it is possible to realize downsizing in the axial direction. Also in the radial direction, the resolver stator section 13 is not arranged about the entire periphery but arranged only at a position corresponding to a predetermined part of the angle of rotation, and hence it is also possible to realize downsizing in the radial direction at the same time with downsizing in the axial direction. In addition, the resolver stator section 13 arranged only in the predetermined rotation angle range is configured to be arranged in the inside of the terminal box 18 formed to project to the casing side portion of the linear actuator. This eliminates the necessity that the linear actuator is extended in the radial direction thereof for arrangement of the resolver stator section 13, and hence it is possible to realize downsizing in the radial direction of the axis of rotation of the apparatus.

The linear actuator of the present invention is assumed to be used for a rocking controller for a railway vehicle and aims at controlling the rotating force. Therefore, the linear actuator does not aim to provide a precise positioning, and hence does not require precise detection of the rotation angle. For this reason, as in the present invention, the rotation angle detection means does not need to have a configuration having a resolver stator section which is a detection terminal for the entire circumference of the rotation angle, and hence the detecting section arranged only at a part of the angles of rotation as described in the present invention can attain the purpose as the rotation detecting means. Deterioration of efficiency due to an error of a detected angle is cos (error electrical angle). Therefore, for example, even when the detected error is 10 degrees in electrical angle, the efficiency deterioration is about 1.5%, and hence the influence of the error of the detected angle is negligible in the rocking controller for the railway vehicle, which is not used for position control but is used for force control.

In the present embodiment, the segment VR type resolver is exemplified as the rotation angle detection means, but the present invention is not limited to this. For example, even when a similar rotation angle detection means is configured by an eddy current sensor, the effect of the present invention can be obtained. In the case where the eddy current sensor is used, instead of the segment type VR resolver, the effect of the present invention can be obtained by using a rotation angle sensor configured in such a manner that a conductor structure generating an inductance change due to a periodic eddy current based on the rotation angle in the circumferential direction, and the eddy current sensor fixed to the main body at a part of the angular range about the rotation axis of the hollow rotor 10 on the radial direction outer side of the resolver rotor 14, are arranged on the open end portion side of the end surface of the closed end portion of the hollow rotor 10, and on the radially outer side of the outer peripheral surface of the hollow rotor 10. That is, it is possible to realize downsizing in the radial direction and the axial direction of the linear actuator.

Since the magnet 12 and the stator winding 11 are strongly magnetized, it is necessary that abrasion powders, generated by slide sections (the linear motion oil seal 3 and the slide section 6) in the sealed region 5, rolling sections (the angular bearing 9, the rotation/linear motion converting section 7, the bearing 16), and the like, are prevented from adhering to the magnet 12 and the stator winding 11. For this reason, in order to prevent that the generated abrasion powders, such as iron powders, are scattered in the sealed region 5, each of the rotating sections (the angular bearing 9, the rotation/linear motion converting section 7, the bearing 16) is lubricated with low viscosity grease. Further, a noncontact labyrinth seal 15 is provided at a portion between the casing central section 21 and the hollow rotors 10, which portion is located between the angular bearing 9, and the magnet 12 and the stator winding 11 (portion in which the hollow motor is formed), and the low viscosity grease is used in this portion. The hollow structure (sealed space), formed by the casings 20, 21 and 22, and by the linear motion oil seal 3 and the slide section 6 of the linear motion rod 2, which are installed at the opening of the casing front section 20, is divided into two regions by the noncontact labyrinth seals 15. Thereby, the magnet 12 and the stator winding 11 (hollow motor) are arranged in the one divided region, while the linear motion oil seal 3, the slide section 6, the rotation/linear motion converting section 7, and the angular bearing 9 are arranged in the other divided region. Further, the rear end portion of the hollow rotor 10 is sealed by the rotor end cap. Thereby, the sealed region 5 is divided into the region in which the rotation/linear motion converting section 7 is installed, and in which many abrasion powders may be most frequently generated, and the region in which the magnet 12 and the stator winding 11 are installed. Therefore, it is possible to reduce the risk that the magnet 12 and the stator winding 11 are brought into contact with the abrasion powders, such as iron powders.

With this configuration, even under severe use condition in which the maintenance interval is long, the function of the linear actuator can be maintained without being lowered.

The operation and function of the linear actuator of the present embodiment will be described with referring to the sectional view of the linear actuator in the minimum stroke shown in FIG. 3, and with referring to the sectional view of the linear actuator in the maximum stroke shown in FIG. 4.

In the state of the minimum stroke shown in FIG. 3, when the hollow motor is driven at a predetermined rotation by a controller (not shown), so that thereby the magnet 12 is rotated with respect to the stator winding 11, the hollow rotor 10 is rotated, and the rotation/linear motion converting section 7 engaged with the groove section of the inner peripheral surface of the hollow rotor 10 is linearly moved forward in the axial direction. Thereby, the linear motion rod 2 fixed to the rotation/linear motion converting section 7 is linearly moved forward in the axial direction. Here, the first spherical bearing 1a fixed to the front side end portion of the linear motion rod 2, and the second spherical bearing 1b fixed to the casing rear section 22 are respectively connected to structures, for example a main body and a bogie truck of a railway vehicle, which are to be controlled by the linear actuator. Therefore, relative free rotation between the linear motion rod 2 and the casing rear section 22 is restricted, and the hollow rotor 10 is rotated in the state in which free rotation with respect to the casing of rotation/linear motion converting section 7 is restrained. Thereby, the linear motion rod 2 is linearly moved in the axial direction by the relative rotation between the rotation/linear motion converting section 7 and the hollow rotor 10.

When the linear actuator of the present invention is used in a rocking controller of a railway vehicle, active control for aerodynamic characteristics during high speed traveling is especially required. For example, the active control is required to suppress an instantaneous rolling of a vehicle, which is caused at a time when entering a tunnel in high-speed, or rolling in the last car of a train set due to the influence of Karman's vortex at high-speed traveling or the like, though it does not occur in low-speed traveling. There is a case where the active control for suppressing these kinds of rocking is not required under a condition, such as travelling under a predetermined speed, other than predetermined conditions. Therefore, it is required that the linear actuator is driven without applying load (back drive force) to external force as much as possible in the state where the power supply of the linear actuator is turn off. In this regard, the noncontact labyrinth seal 15 is installed on the radial direction outer side of the rotary shaft with respect to the hollow rotor 10, so that the peripheral length of the seal portion is made long. However, low viscosity grease as a noncontact seal is used at the seal portion, and thereby the linear actuator can be driven with a small load against external force.

In the linear actuator of the present invention, the whole of the hollow rotor 10 is accommodated in the sealed space, and a sliding seal mechanism for rotation of the hollow rotor 10 is not provided, but only the linear motion oil seal 3 for linear motion of the linear motion rod 2 is provided as a sliding seal mechanism for driving the linear actuator. This configuration also provides the effect that the linear actuator is driven without applying a load (back drive force) to external force as much as possible in the state where the power supply of the linear actuator is turn off.

In the linear actuator of the present invention, the sealed region 5 is formed in the inside of the casing configured by the casing front section 20, the casing central section 21, the casing rear section 22, and the seal structure formed by the slide section 6 of the linear motion rod 2 and the linear motion oil seal 3. Thereby, the linear actuator prevents that outside air is made to flow into or from the sealed region 5 by the pressure fluctuation in the sealed region 5 due to the stroke displacement of the linear motion rod 2 (i.e., the linear actuator of the present invention is not provided with an air breather function). For this reason, the linear actuator of the present invention provides the effect that, even when the linear actuator is used under a conditions of low temperature, such as −20 degrees, lowering of the sliding function due to phenomena, such as freezing of moisture in air entering into the actuator, is not caused, and the good sliding state is maintained. Further, since the main body of the linear actuator of the present invention is sealed against the outside air, moisture, dust, and the like, in the air can be prevented from entering the main body, and hence the stable function of the linear actuator is maintainable.

It should be noted that inert gas, such as air or nitrogen, may be used as the gas in the sealed region 5.

The sealed region 5 is a sealed space in which the product of the volume occupied by the gas and the pressure of the gas is constant. Therefore, when the volume occupied by the gas in the sealed region 5 is changed from V1 to V2, and when the pressure is changed from P1 to P2, the pressure P2 after the volume change is expressed by the following expression.

$$P2 = P1 \times \frac{V1}{V2} = P1 \times \frac{V1}{V1 + \Delta V} \quad \text{[Expression 1]}$$

Here, ΔV represents the amount of change (V2−V1) from V1 to V2 of the volume occupied by the gas. Since the linear actuator of the present invention is compactly configured, the volume of the casing is small, and the difference (ratio) between V1 and V2 easily becomes large. As a result, pressure fluctuation in the sealed region 5 tends to be large due to the forward/rear movement of the linear motion rod. However, when the pressure fluctuation in the sealed region 5 is large, and when the linear actuator needs to be driven with a small back drive force against external force without performing active control, the linear actuator is inhibited from being freely driven. For this reason, in the linear motion rod 2 of the linear actuator of the present invention, a hollow portion 2a, having an opening at the rear end portion as the closed end portion side of the hollow rotor, is formed to extend in the axial direction. In this configuration, ΔV as the amount of change from V1 of the volume occupies by the gas to V2, which change is caused by the front/rear movement of the linear motion rod, is the same as the volume represented by the product of the cross-sectional area of the linear motion rod 2 with the maximum stroke length. However, since V1 becomes large by the volume of the hollow portion 2a, the influence of ΔV on P2 can be suppressed.

$$P2 = P1 \times \frac{V1}{V2} = P1 \times \frac{V1}{V1 + \Delta V} = P1 \times \frac{1}{1 + \frac{\Delta V}{V1}} \quad \text{[Expression 2]}$$

Thereby, the sealing property of the sealed region 5 can be maintained, and it is possible to suppress that the linear actuator is inhibited from being driven.

It is preferred that a cover, such as a bellows, (not shown) is provided between the casing front section 21 and the first spherical bearing 1a to prevent that power dusts, and the like, adhere to the outer surface of the slide section 6. Thereby, when the linear motion rod 2 projects from the casing front section 21 which is the distal end portion of the main body by the stroke change, it is possible to prevent that the slide section 6 of the linear motion rod 2 are exposed to the surrounding environment, and thereby moisture, dust, and the like adhere to the outer surface of the slide section 6.

As described above, with the configuration of the present embodiment, an external apparatus, such as a pressure generator, is not required in addition to the main body of the linear actuator. Further, it is not necessary to install pressurized fluid pipes of a drive source which is required in the case of a controller using pressurized fluid, and hence it is possible to provide a linear actuator compact in the total length and outer diameter. Further, the configuration of the present embodiment provides a function, as a linear actuator, for applying desired driving force or damping force, and also provides a linear actuator capable of being easily driven without applying large load (back drive force) to external force at the time when the function of the linear actuator is not required. Further, the configuration of the present embodiment provides a linear actuator which stably functions with low back drive force under a severe use condition where it is difficult to perform maintenance, such as frequent replacement, and where the temperature changes in the installation and use environment is large (−20° C. to 60° C.)

Embodiment 2

Figure 6:
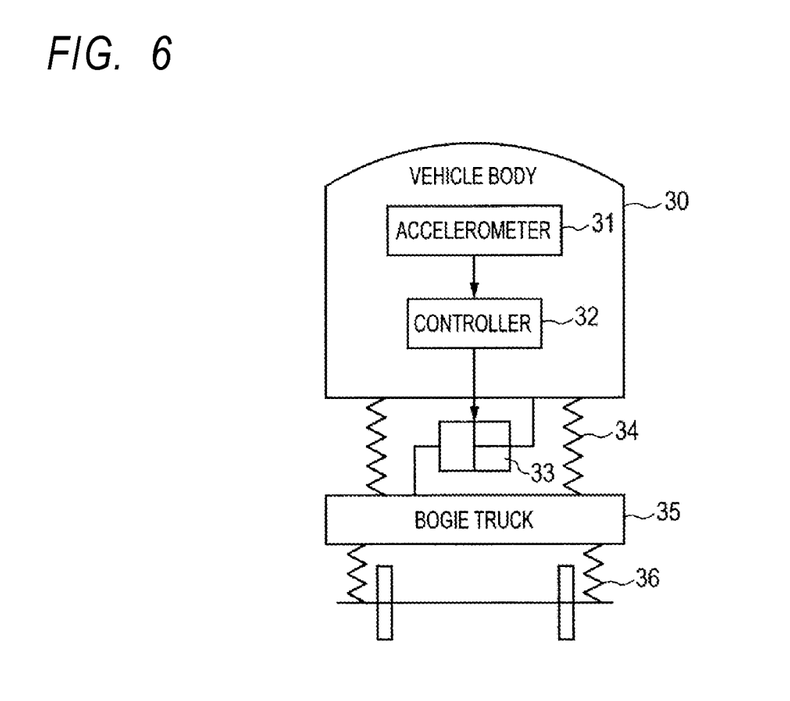
FIG. 6 is a view showing a schematic configuration of a rocking controller for a railway vehicle, to which the linear actuator of the present invention is applied.

FIG. 6 shows a schematic view of a rocking controller for a railway vehicle, to which apparatus the linear actuator according to embodiment 1 of the present invention is applied. The rocking controller for the railway vehicles of the present embodiment includes the actuator of embodiment 1 of the present invention, which is installed between a bogie truck 35 and a vehicle body 30 of the railway vehicle, and a controller 32 which performs active control for driving a linear actuator 33 to suppress rocking of the vehicle body 30.

Vibration is transmitted from wheels to the bogie truck 35 via primary springs 36, and the vibration of the bogie truck 35 is transmitted to the vehicle body 30 via secondary springs 34. An accelerometer 31 measures acceleration of the vehicle body 30, and the controller 32 actively controls the linear actuator 33 according to the measured acceleration, so as to suppress rocking (vibration) of the vehicle body 30. Various known control methods can be applied to the active control by the controller.

In the railway vehicle, it is important to suppress vibration (rocking) in the horizontal direction perpendicular to the traveling direction of a vehicle, in order to improve riding comfort of passengers of the railway vehicle and to stabilize the posture of the vehicles during traveling. When a linear actuator is used in order to suppress rocking of a railway vehicle, it is most efficient that the linear actuator is arranged in the horizontal direction perpendicular to the traveling direction of the vehicle. From the viewpoint of accommodating the linear actuator within the restrained width of the railway vehicle, the compact linear actuator of the present invention has a great advantage. Especially under the conditions to which the narrow-gauge standards are widely applied, it is advantageous to apply the compact linear actuator of the present invention to the rocking controller of the vehicle body in a railway vehicle.

Even when a rocking controller of a vehicle body in a railway vehicle is used under severe condition where it is difficult to perform maintenance, such as frequent replacement, and where the temperature changes in the installation and use environment is large, it is possible to realize the rocking controller for the railway vehicles in which the operation effects of the linear actuator of the present invention is fully exhibited. That is, an external apparatus, such as a pressure generator, is not required in addition to the main body of the linear actuator, and also it is not necessary to install pressurized fluid pipes of a drive source required for a controller using pressurized fluid. Thereby, it is possible to realize a rocking controller for a railway vehicle, which is provided with a compact linear actuator in which the total length and outer diameter are reduced. Further, the present invention provides a linear actuator which applies desired driving force or damping force, and also which can be easily driven without applying large load (back drive force) to external force at the time when the function of the linear actuator is not required. Further, the present invention provides a rocking controller for a railway vehicle, which is provided with a linear actuator that stably functions with low back drive force even under a severe use condition where it is difficult to perform maintenance, such as frequent replacement, and where the temperature changes in the installation and use environment is large (−20° C. to 60° C.)

This application claims the benefit of Japanese Patent Application No. 2013-147737, filed in Japan on Jul. 16, 2013, which is hereby incorporated by reference herein in its entirety.

REFERENCE SIGNS LIST

1a: First spherical bearing
1b: Second spherical bearing
2: Linear motion rod
2a: Hollow portion
3: Linear motion oil seal
4: Linear motion bearing
5: Sealed region
6: Slide section
7: Rotation/linear motion converting section
8a, 8b: Bearing fixing nut
9: Angular bearing
10: Hollow rotor (nut)
11: Hollow motor (stator winding)
12: Hollow motor (magnet)
13: Resolver stator section
13a: Winding section
14: Resolver rotor section
15: Noncontact labyrinth seal
16: Bearing
17: Rotor end cap
18: Cable holder
20: Casing front section
21: Casing central section
22: Casing rear section
22a: Bearing receiving recess
30: Vehicle body
31: Accelerometer
32: Controller
33: Linear actuator
34: Secondary spring
35: Bogie truck
36: Primary spring

The invention claimed is:

1. A linear actuator comprising:
a hollow rotor that has a magnet fixed to a part of the outer peripheral surface thereof, and a spiral groove formed in the inner peripheral surface thereof, and has a hollow structure having an open end portion and a closed end portion;
a main body that supports and accommodates the hollow rotor so as to make the hollow rotor rotatable about the axis of rotation of the hollow rotor, and has a stator winding at a position facing the magnet of the hollow rotor;
a rotation/linear motion converting section that is arranged in the hollow rotor and is engaged with the spiral groove to be linearly moved in the axial direction of the hollow rotor by rotation of the hollow rotor;
a linear motion rod that has one end portion thereof fixed to the rotation/linear motion converting section, and the other end portion thereof extended from the opening end portion of the main body, and has, on the outer periphery thereof, a slide section made to slide in the axial direction via a linear motion oil seal arranged at the open end portion of the main body, so that the linear motion oil seal and the slide section cooperate with each other to form a sealed space in the main body; and
a segment type resolver that detects rotational position of the hollow rotor and is configured by a resolver rotor fixed at the radial outer side of the outer peripheral surface of the hollow rotor and on the open end portion side of the end surface of the closed end portion of the hollow rotor, and a resolver stator fixed to the main body at a part of the angular range about the axis of rotation of the hollow rotor and on the radial outer side of the resolver rotor,
wherein: the magnet and the stator winding form a hollow motor;
the main body includes first rotary support means which, on the open end portion side of the portion formed with the hollow motor, supports the hollow rotor so as to allow the hollow rotor to rotate about the axis of rotation of the hollow rotor with respect to the main body, and second rotary support means which supports the closed end portion of the hollow rotor so as to allow the closed end portion to rotate about the axis of rotation of the hollow rotor; and
the whole of the hollow rotor is accommodated in the sealed space.

2. The linear actuator according to claim 1, wherein no sliding seal mechanism is provided between the hollow rotor and the main body, and between the hollow rotor and the linear motion rod.

3. The linear actuator according to claim 1, comprising only the linear motion oil seal, as the sliding seal mechanism, for linear motion of the linear motion rod and for rotation of the hollow rotor.

4. The linear actuator according to claim 1, wherein the linear motion rod includes a hollow structure opened on the closed end portion side of the hollow rotor.

5. The linear actuator according to claim 1, wherein the rotation/linear motion converting section is configured by a planetary roller screw.

6. The linear actuator according to claim 1, wherein the rotation/linear motion converting section is configured by a ball screw.

7. The linear actuator according to claim 1, wherein
the main body includes a terminal box projecting in the direction perpendicular to the axial direction, and
the resolver stator is configured in the terminal box.

8. The linear actuator according to claim 1, wherein the segment type resolver is configured by a segment type VR resolver.

9. The linear actuator according to claim 1, comprising, in place of the segment type resolver, a rotation sensor configured by a conductor structure that is arranged at the radial outer side of the outer peripheral surface of the hollow rotor and on the open end portion side of the end surface of the closed end portion of the hollow rotor, so as to cause an inductance change due to periodic eddy current based on the rotation angle in the circumferential direction, and an eddy current sensor fixed to the main body at a part of the angular range about the axis of rotation of the hollow rotor on the radially outer side of the resolver rotor.

10. The linear actuator according to claim 1, wherein the second rotation support means is a bearing fixed to a bearing receiving recess of the inner wall of the closed end portion of the main body.

11. The linear actuator according to claim 1, wherein
noncontact labyrinth seal dividing the sealed space is provided between the main body and the hollow rotor, and
the hollow motor is arranged in the divided one region, and the first rotation support means is arranged in the divided other region.

12. A rocking controller for a railway vehicle comprising:
a linear actuator, comprising:
 a hollow rotor that has a magnet fixed to a part of the outer peripheral surface thereof, and a spiral groove formed in the inner peripheral surface thereof, and has a hollow structure having an open end portion and a closed end portion;
 a main body that supports and accommodates the hollow rotor so as to make the hollow rotor rotatable about the axis of rotation of the hollow rotor, and has a stator winding at a position facing the magnet of the hollow rotor;
 rotation/linear motion converting section that is arranged in the hollow rotor and is engaged with the spiral groove to be linearly moved in the axial direction of the hollow rotor by rotation of the hollow rotor;
 a linear motion rod that has one end portion thereof fixed to the rotation/linear motion converting section, and the other end portion thereof extended from the opening end portion of the main body, and has, on the outer periphery thereof, a slide section made to slide in the axial direction via a linear motion oil seal arranged at the open end portion of the main body, so that the linear motion oil seal and the side section cooperate with each other to form a sealed space in the main body; and
 a segment type resolver that detects rotational position of the hollow rotor and is configured by a resolver rotor fixed at the radial outer side of the outer peripheral surface of the hollow rotor and on the open end portion side of the end surface of the closed end portion of the hollow rotor, and a resolver stator fixed to the main body at a part of the angular range about the axis of rotation of the hollow rotor and on the radial outer side of the resolver rotor,
 wherein: the magnet and the stator winding form a hollow motor;
 the main body includes first rotary support means which, on the open end portion side of the portion formed with the hollow motor, supports the hollow rotor so as to allow the hollow rotor to rotate about the axis of rotation of the hollow rotor with respect to the main body, and second rotary support means which supports the closed end portion of the hollow rotor so as to allow the closed end portion to rotate about the axis of rotation of the hollow rotor; and
 the whole of the hollow rotor is accommodated in the sealed space,
the linear actuator being installed between a bogie truck and a vehicle body of the railway vehicle; and
a controller for actively controlling the drive of the linear actuator so as to suppress rocking of the vehicle body.

* * * * *